United States Patent
Rao

(10) Patent No.: US 8,616,451 B1
(45) Date of Patent: Dec. 31, 2013

(54) FINGER SENSING DEVICE INCLUDING FINGER SENSING INTEGRATED CIRCUIT DIE WITHIN A RECESS IN A MOUNTING SUBSTRATE AND RELATED METHODS

(75) Inventor: Yang Rao, Rockledge, FL (US)

(73) Assignee: Authentec, Inc., Melbourne, FL (US)

( * ) Notice: Subject to any disclaimer, the term of this patent is extended or adjusted under 35 U.S.C. 154(b) by 0 days.

(21) Appl. No.: 13/529,170

(22) Filed: Jun. 21, 2012

(51) Int. Cl.
*G06K 7/00* (2006.01)

(52) U.S. Cl.
USPC ................................. 235/439; 235/375

(58) Field of Classification Search
USPC ......................... 235/439, 375, 476
See application file for complete search history.

(56) References Cited

U.S. PATENT DOCUMENTS

| | | | |
|---|---|---|---|
| 5,953,441 A | 9/1999 | Setlak | |
| 6,289,114 B1 | 9/2001 | Mainguet | |
| 6,327,376 B1 * | 12/2001 | Harkin | 382/124 |
| 6,927,581 B2 | 8/2005 | Gozzini | |
| 7,049,166 B2 | 5/2006 | Salatino et al. | |
| 7,361,919 B2 | 4/2008 | Setlak | |
| 7,424,136 B2 | 9/2008 | Setlak et al. | |
| 7,599,532 B2 | 10/2009 | Setlak et al. | |
| 7,606,400 B2 | 10/2009 | Ryhanen et al. | |
| 7,616,786 B2 | 11/2009 | Setlak | |
| 7,697,281 B2 | 4/2010 | Dabov et al. | |
| 7,697,729 B2 | 4/2010 | Howell et al. | |
| 7,715,593 B1 | 5/2010 | Adams et al. | |
| 7,734,068 B2 | 6/2010 | Fisher | |
| 7,809,168 B2 | 10/2010 | Abiko et al. | |
| 7,894,643 B2 | 2/2011 | Setlak | |
| 8,145,916 B2 | 3/2012 | Boshra et al. | |
| 2008/0009102 A1 * | 1/2008 | Yang et al. | 438/126 |
| 2009/0083850 A1 | 3/2009 | Fadell et al. | |
| 2010/0082444 A1 | 4/2010 | Lin et al. | |
| 2010/0321158 A1 | 12/2010 | Setlak et al. | |
| 2010/0321159 A1 * | 12/2010 | Stewart | 340/5.83 |
| 2011/0175703 A1 | 7/2011 | Benkley, III | |
| 2011/0254108 A1 * | 10/2011 | Gozzini et al. | 257/415 |

* cited by examiner

*Primary Examiner* — Edwyn Labaze
(74) *Attorney, Agent, or Firm* — Allen, Dyer, Doppelt, Milbrath & Gilchrist, P.A.

(57) ABSTRACT

A finger sensing device may include a mounting substrate having a recess in a top surface thereof and having conductive through-vias extending from the top surface to a bottom surface. The conductive through-vias may extend laterally adjacent to the recess. The finger sensing device may also include a finger sensing integrated circuit (IC) die within the recess and may include a finger sensing area on a top surface thereof and bond pads on the top surface laterally adjacent the finger sensing area. The finger sensing device may also include a dielectric layer over the mounting substrate and the finger sensing IC die. The finger sensing device may further include a conductive pattern carried by the dielectric layer and coupling the conductive through-vias to respective ones of the bond pads.

24 Claims, 4 Drawing Sheets

FINGER SENSING DEVICE INCLUDING FINGER SENSING INTEGRATED CIRCUIT DIE WITHIN A RECESS IN A MOUNTING SUBSTRATE AND RELATED METHODS

FIELD OF THE INVENTION

The present invention relates to the field of electronics, and, more particularly, to finger sensing devices and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference, discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-finger sensing device sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., the assignee of the present invention, is widely used in a variety of notebooks, desktops and PC peripherals. Other fingerprint sensors, for example, the AES850, also from AuthenTec, Inc. of Melbourne, Fla., is a multi-function smart sensor that expands touch-based functionality of touchscreen and QWERTY smartphones with a reduced impact on sensor performance or durability. Thus, a fingerprint sensor may be particularly advantageous for providing more convenient access to the electronic device without a password, for example, and, more particularly, without having to type the password, which is often time consuming. A fingerprint sensor may also be particularly advantageous for starting one or more applications on the electronic device.

U.S. Patent Application Publication No. 2011/0175703 to Benkley, III discloses an electronic imager using an impedance sensor grid array mounted on or about a switch. More particularly, Benkley, III discloses a switch being incorporated into a sensor assembly that allows integration of sensor operations, such as, fingerprint sensor operations. A fingerprint sensor can be used for authentication while being used together with a power switch or navigation selection switch. The authentication may be used to access the device entirely or access different levels of information.

U.S. Patent Application Publication No. 2009/0083850 to Fadell et al. discloses an embedded authentication system in an electronic device. More particularly, Fadell et al. discloses authenticating a user via a fingerprint to provide access to resources or content that was previously not available. The electronic device may allow a user to authenticate for a particular amount of time for accessing restricted resources.

U.S. Pat. No. 7,809,168 to Abiko et al. discloses a biometric information input device. More particularly, Abiko et al. discloses a movement direction detection means for detecting a movement direction of a finger with respect to the fingerprint sensor, based on partial fingerprint images collected by the fingerprint sensor.

While a fingerprint sensor used in an electronic device may be particularly advantageous for authentication, navigation, etc., it is generally desirable that these sensors have a reduced size to accommodate the relatively small amount of space in the housing of the portable electronic device. However, making a fingerprint sensor smaller may make it more susceptible to breakage, and increase production costs.

SUMMARY OF THE INVENTION

In view of the foregoing background, it is therefore an object of the present invention to provide a finger sensing device having a reduced package size, for example, for occupying less area in a mobile wireless communications device.

This and other objects, features, and advantages in accordance with the present invention are provided by a finger sensing device that may include a mounting substrate having a recess in a top surface thereof and having a plurality of conductive through-vies extending from the top surface to a bottom surface. The conductive through-vias may be laterally adjacent to the recess. The finger sensing device may also include a finger sensing integrated circuit (IC) die within the recess and may include a finger sensing area on a top surface thereof and a plurality of bond pads on the top surface laterally adjacent the finger sensing area. The finger sensing device may also include a dielectric layer over the mounting substrate and the finger sensing IC die, for example. The finger sensing device may further include a conductive pattern carried by the dielectric layer and coupling the plurality of conductive through-vias to respective ones of the plurality of bond pads. Accordingly, the finger sensing device may have a reduced thickness on a top thereof so that, for example, it may image through other materials as compared to a finger sensing device that includes wire bonds on the top.

The mounting substrate and the finger sensing IC die may have flush top surfaces, for example. Each of the plurality of conductive through-vies may include an upper tapered portion, a lower vertical portion, and an intermediate landing pad therebetween.

The finger sensing device may further include a respective conductive via coupling each of the plurality of bond pads and an adjacent portion of the conductive pattern, for example. The conductive pattern may define a finger drive electrode, for example.

The finger sensing device may further include a plurality of conductors coupled to respective ones of the plurality of conductive through-vias and defining a grid array pattern, for example. The finger sensing device may further include a further dielectric layer over the conductive pattern and the dielectric layer.

The dielectric layer may have a thickness less than or equal to 25 microns. The plurality of conductive through-vias and the conductive pattern may include copper, for example.

A method aspect is directed to a method of making a finger sensing device. The method may include forming a mounting substrate having a recess in a top surface thereof and having a plurality of conductive through-vias extending from the top surface to a bottom surface. The conductive through-vias may be laterally adjacent to the recess. The method may further include positioning a finger sensing integrated circuit (IC) die within the recess and including a finger sensing area on a top surface thereof and a plurality of bond pads on the top surface laterally adjacent the finger sensing area, for example. The method may further include positioning a dielectric layer over the mounting substrate and the finger sensing IC die. The dielectric layer may carrying a conductive pattern. The method may further include coupling the conductive pattern to the plurality of conductive through-vias and to respective ones of the plurality of bond pads.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
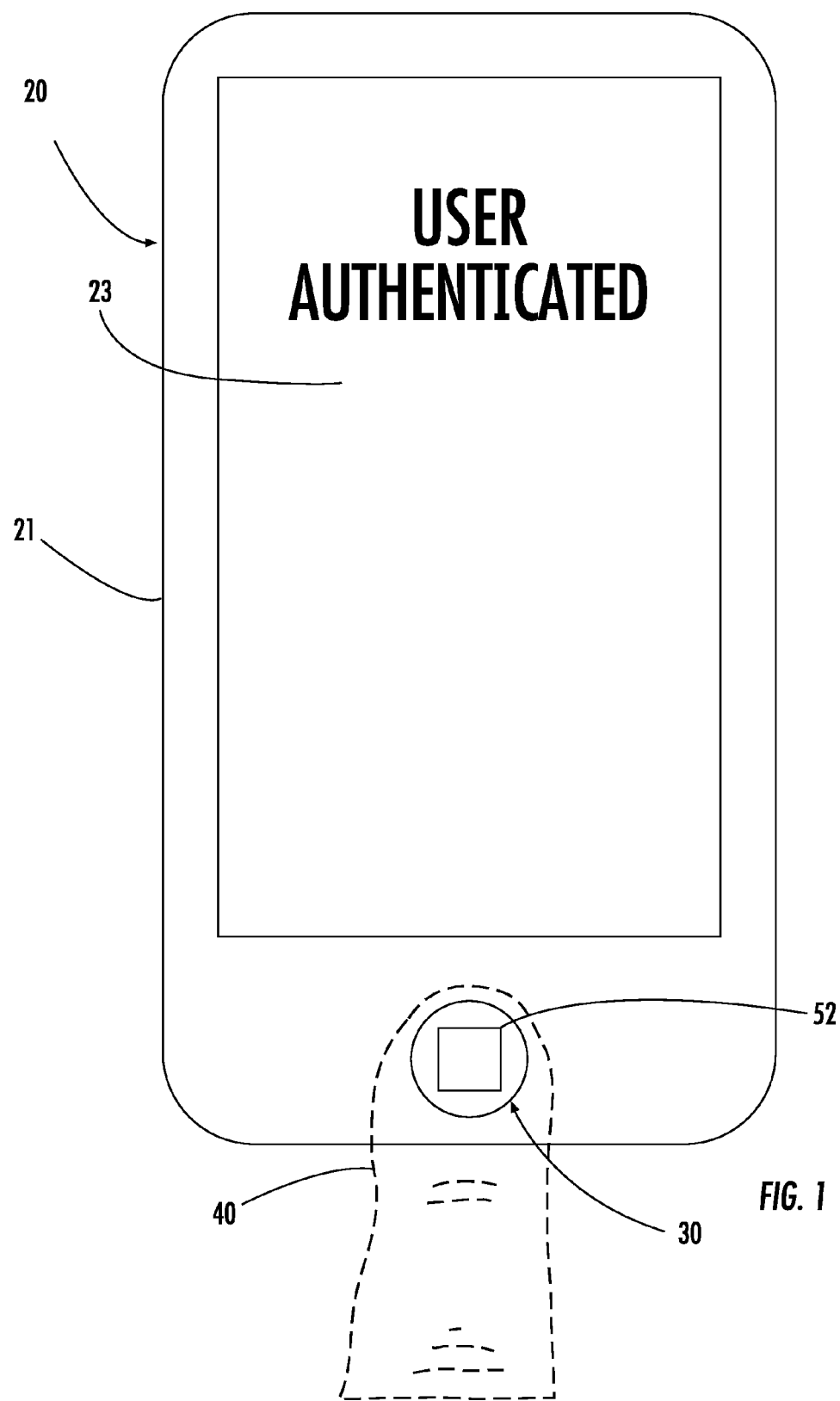
FIG. 1 is a plan view of an electronic device including a finger sensing device in accordance with the present invention.
Figure 2:
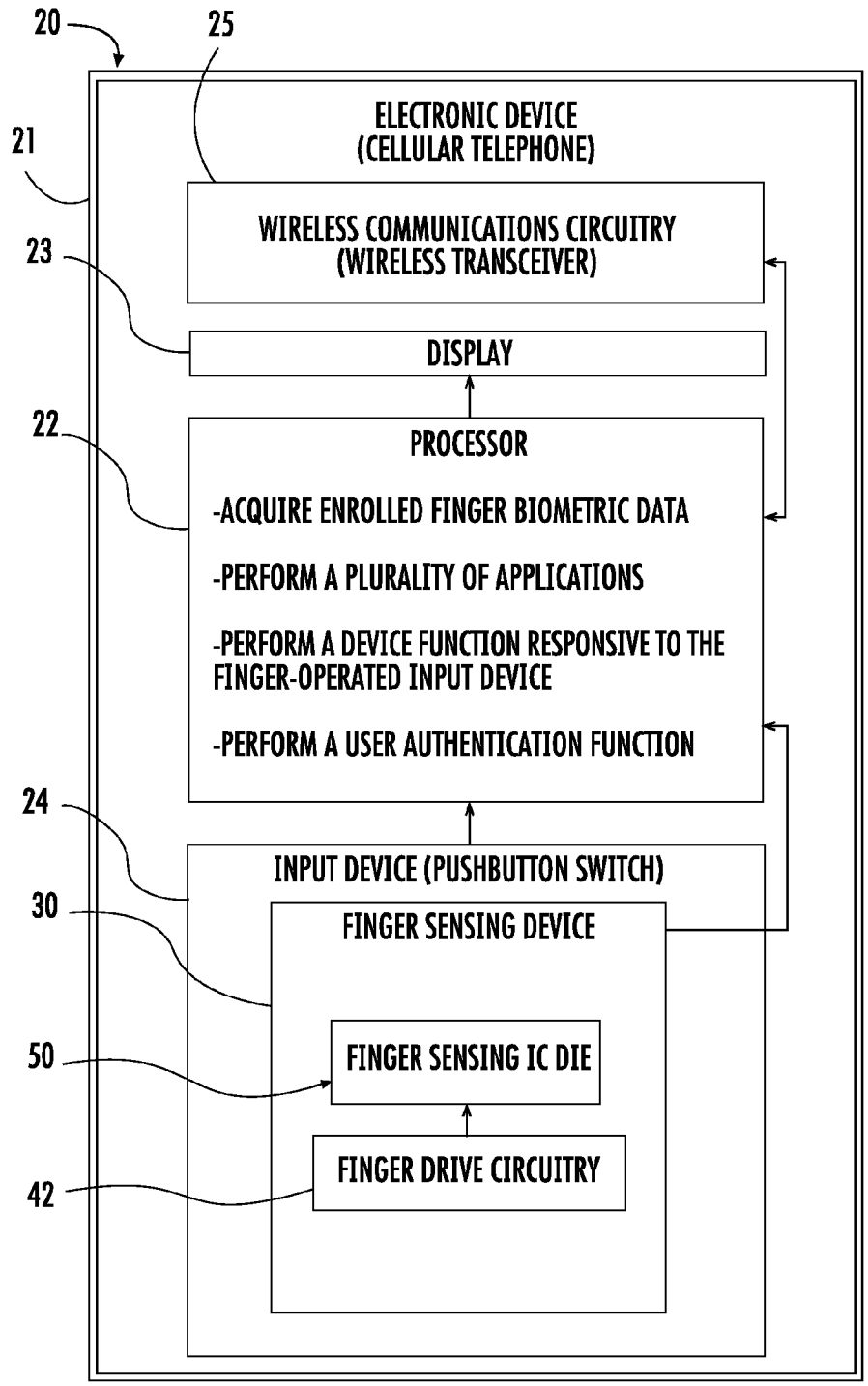
FIG. 2 is a schematic block diagram of the electronic device and finger sensing device of FIG. 1.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone or smartphone. The electronic device 20 may be another type of electronic device, for example, a tablet computer, laptop computer, etc.

A wireless transceiver 25 is also carried within the portable housing 21 and is coupled to the processor 22. The wireless transceiver 25 cooperates with the processor 22 to perform at least one wireless communications function, for example, for voice and/or data communication. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art.

A finger-operated input device, illustratively in the form of a pushbutton switch 24, is also carried by the portable housing 21 and is coupled to the processor 22. The pushbutton switch 24 cooperates with the processor 22 to perform one or more device functions in response to operation of the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. The processor 22 may also toggle between applications executed by the processor based upon pressing of the pushbutton switch 24. Of course, other device functions may be performed based upon the pushbutton switch 24 for example, finger biometric data enrollment and/or finger biometric data matching. In some embodiments, the finger-operated input device 24 may be a different type of finger-operated input device, for example, forming part of a touch screen display. Other or additional finger-operated input devices may be carried by the portable housing 21.

Figure 3:
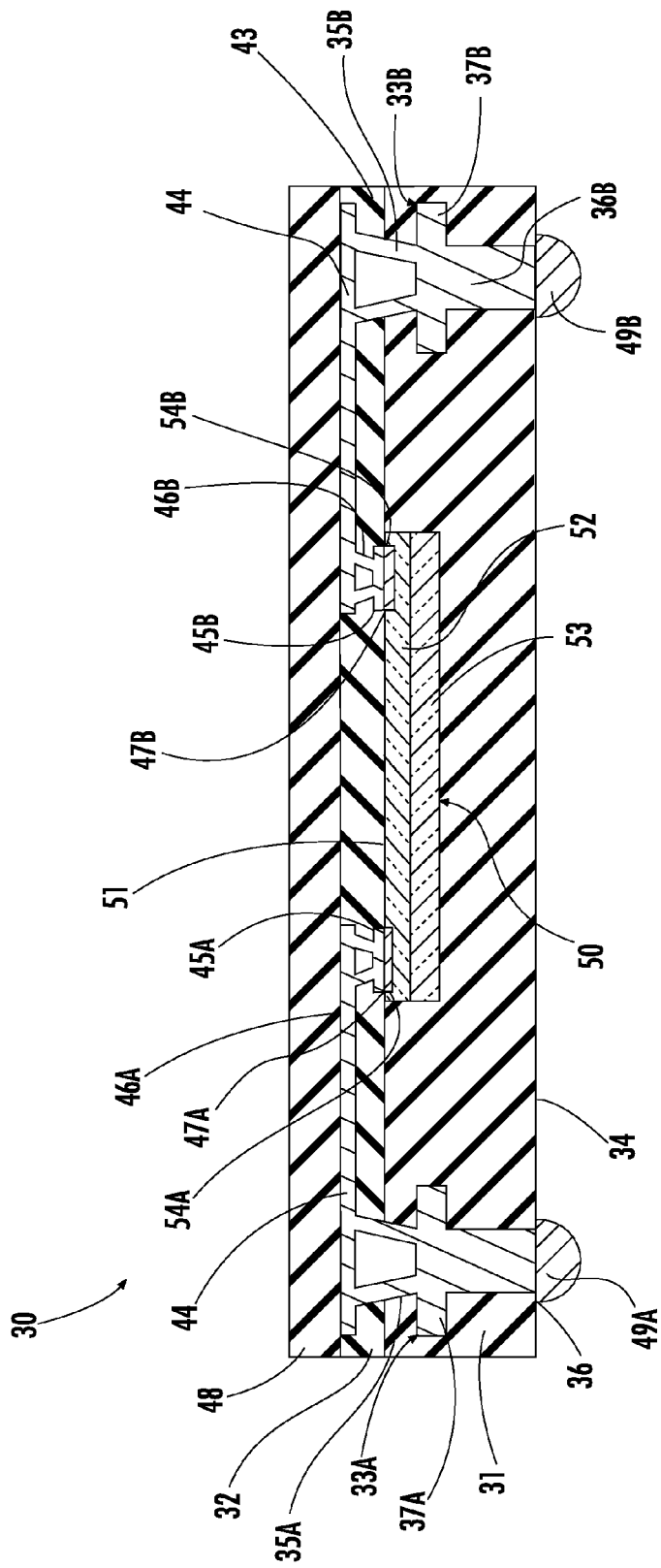
FIG. 3 is a cross-sectional view of the finger sensing device of FIG. 1.

Referring now additionally to FIG. 3, a finger sensing device 30 is carried by the pushbutton switch 24 to sense a user's finger 40. The finger sensing device 30 is carried by the pushbutton switch 24 so that when a user contacts and/or presses downward on the pushbutton switch, finger biometric data from the user's finger 40 is acquired, for example, for finger matching and/or finger enrollment to be stored and later used for matching.

The finger biometric data may include fingerprint minutae data, ridge and/or valley fingerprint image data, ridge flow data, finger pore data, etc. For example, the finger sensing device 30 may be a finger sensor as described in U.S. Pat. No. 5,953,441 to Setlak and/or as described in U.S. Pat. No. 6,927,581 to Gozzini, and assigned to the assignee of the present invention and the entire contents of which are herein incorporated by reference.

The finger sensing device 30 includes a mounting substrate 31 having a recess in a top surface 32 thereof. The mounting substrate 31 includes a dielectric material, for example. Conductive through-vias 33a, 33b extend from the top surface 32 to a bottom surface 34. The conductive through-vias 33a, 33b illustratively extend laterally adjacent to the recess. As will be appreciated by those skilled in the art, the mounting substrate 31 may include number of conductive through-vias 33.

The conductive through-vias 33a, 33b each include an upper tapered portion 35a, 35b, a lower vertical portion 36a, 36b, and an intermediate landing pad therebetween 37a, 37b. Of course other and/or additional through-via arrangements may be formed within the mounting substrate 31. The through-vias 33a, 33b may include copper, for example.

A finger sensing integrated circuit (IC) die 50 is within the recess so that the top surface 32 of the mounting substrate 31 and a top surface 51 of the finger sensing IC die are flush. In other words finger sensing IC die 50 is embedded within the mounting substrate 31. The finger sensing IC die 50 being within the recess advantageously reduces the overall thickness of the finger sensing device 30 as will be appreciated by those skilled in the art.

The finger sensing IC die 50 includes a finger sensing area on the top surface 51 thereof to receive a user's finger 40 adjacent thereto. More particularly, the finger sensing IC die 50 may include by an array of biometric finger sensing pixels 31 to receive the user's finger 40 adjacent thereto. The array of finger biometric sensing pixels 52 are carried by a semiconductor substrate 53, for example, a silicon substrate. The array of biometric finger sensing pixels 52 may be any array size, as will be appreciated by those skilled in the art, but may be particularly sized to be carried by the pushbutton switch 24. The array of biometric finger sensing pixels 52 are illustratively in the shape of a square. In some embodiments, the array of biometric finger sensing pixels 52 may have a different shape.

Each biometric finger sensing pixel 52 may be an electric-field sensing pixel, and more particularly, a high impedance electric field sensing pixel. In some embodiments, each finger sensing pixel may be a capacitive sensing pixel, for example, or other type of sensing pixel. As will be appreciated by those skilled in the art, each finger sensing pixel includes a finger sensing electrode.

The finger sensing device 30 also includes bond pads 54a, 54b on the top surface 51 thereof. The bond pads 54a, 54b are laterally adjacent the finger sensing area.

The finger sensing device 30 further includes a dielectric layer 43 over the mounting substrate 31 and the finger sensing IC die 50. The dielectric layer 43 may be a pre-preg material, for example. Of course, the dielectric layer 43 may be another dielectric material. The dielectric layer may have a thickness d less than or equal to 25 microns, for example.

The finger sensing device 30 also includes a conductive pattern 44 carried by the dielectric layer 43. The conductive pattern 44, which may be copper plated, coupled the conductive through-vias 33a, 33b, to respective bond pads 54a, 54b. The conductive pattern 44 may advantageously define a finger drive electrode. More particularly, the conductive pattern 44 may be configured to couple a finger drive signal through the user's finger 40 to the array of biometric finger sensing pixels 52. Of course, the conductive pattern 44 may couple a finger drive signal through more than one user's finger, and more than one conductive pattern or finger drive electrode may be used.

Finger drive circuitry 42 may be coupled to conductive pattern 44. The finger drive circuitry 42 may include a radio frequency drive signal generator, for example. The finger drive circuitry 42 generates the finger drive signal.

A respective conductive via 45a, 45b couples each of the bond pads 54a, 54b and an adjacent portion of the conductive pattern 44. Each respective conductive via 45a, 45b may include a upper tapered portion 46a, 46b and lower landing pad 47a, 47b, for example, similar to the upper tapered portion and the intermediate landing pad of the conductive through-vias 33a, 33b. The respective conductive vias 45a, 45b may be copper.

A further dielectric layer 48 is over the conductive pattern 44 and the dielectric layer 43. The further dielectric layer 48 may include plastic, for example, a polymer. In some embodiments, the further dielectric layer 48 may be contoured for the user's finger 40. In other words, the further dielectric layer 48 may have a curved upper surface for receiving the user's finger 40 thereon during operation of the pushbutton switch 24.

Conductors 49a, 49b are illustratively coupled to respective ones of the conductive through-vias 33a, 33b, at the bottom surface 34 of the mounting substrate 31. The conductors 49a, 49b define a grid array pattern. More particularly, the conductors 49a, 49b may define a ball grid array. In some embodiments, the conductors 49a, 49b may define a land grid array or other arrangement, as will be appreciated by those skilled in the art.

Figure 4:
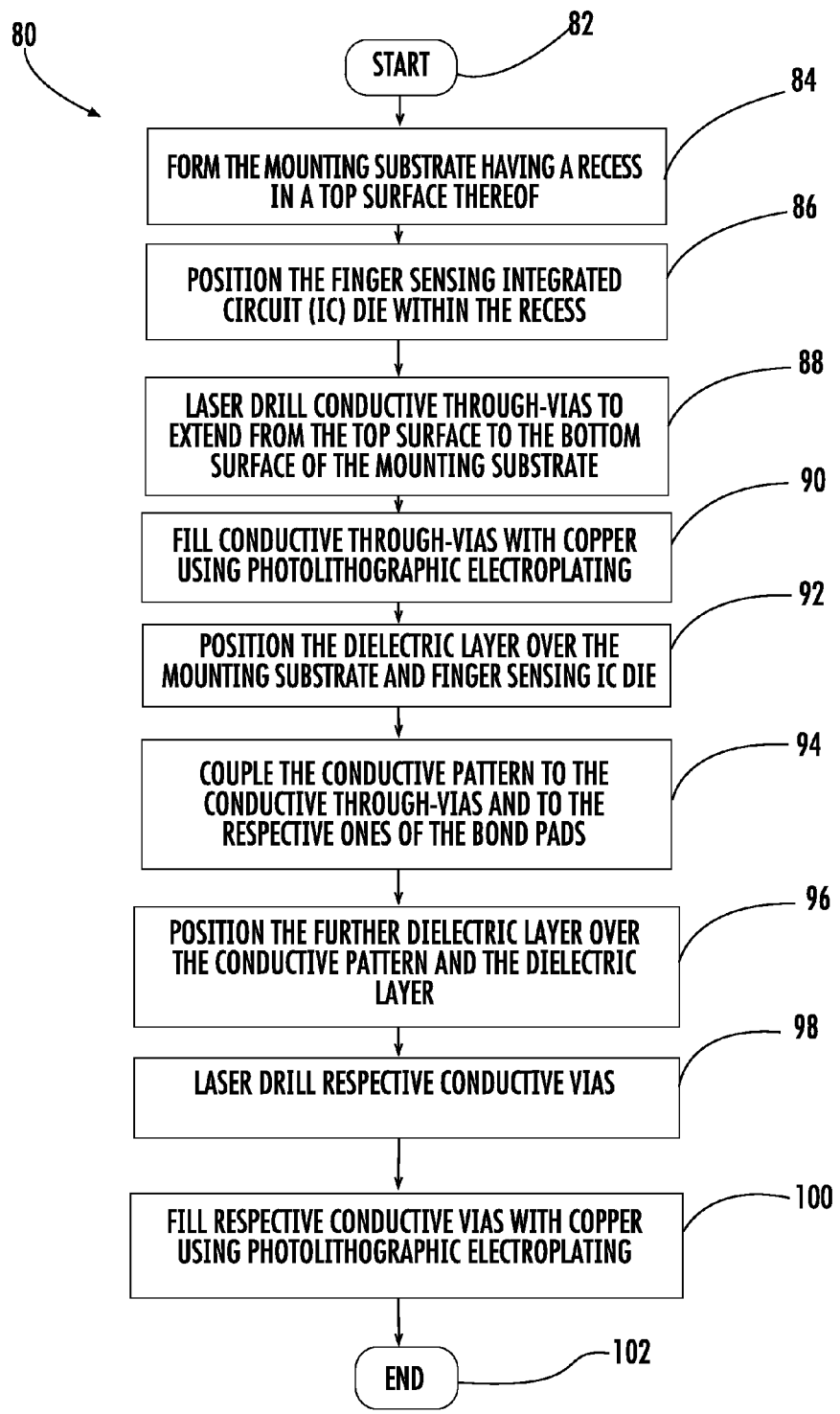
FIG. 4 is a flow chart of a method of making a finger sensing device in accordance with the present invention.

Referring now to the flowchart 80 in FIG. 4, starting at Block 82, a method aspect is directed to a method of making the finger sensing device 30. As will be appreciated by those skilled in the art, the finger sensing device may be made by assembling layers in a stacked relation, for example, via a lamination process or printed circuit board (PCB) build-up process.

The method includes, at Block 84, forming a mounting substrate 31 having a recess in a top surface 32 thereof. The method also includes positioning the finger sensing integrated circuit (IC) die 50 within the recess (Block 86). The connection between the mounting substrate 31 and the finger sensing IC die 50 is performed by a micro-via process, as will be appreciated by those skilled in the art, and described in further detail below.

The conductive through-vias 33a, 33b are formed to extend from the top surface 32 to a bottom surface 34. The conductive through-vias 33a, 33b extend laterally adjacent to the recess. The conductive through-vias 33a, 33b are formed by laser drilling at Block 88. The conductive through-vias 33a, 33b are filled with copper at Block 90 using a photolithographic electroplating process, as will be appreciated by those skilled in the art.

The dielectric layer is positioned or laminated over the mounting substrate 31 and the finger sensing IC die 50 (Block 92). The conductive pattern 44 is coupled at Block 94, to the conductive through-vias 33a, 33b and to respective ones of the bond pads 54a, 54b. The conductive pattern 44 may be formed also by photolithographic electroplating, for example. The further dielectric layer 48 is also positioned over the conductive pattern 44 and the dielectric layer 43 (Block 96). The respective conductive vies 45a, 45b are also formed at Block 98 by laser drilling and filled, at Block 100, with copper using the photolithographic electroplating process. Accordingly, the conductive pattern 44 couples the conductive through-vias 33a, 33b to respective ones of the bond pads 54a, 54b. The method ends at Block 102.

As will be appreciated by those skilled in the art, the finger sensing device 30 advantageously has a reduced size as compared to a finger sensor packaged with wire bonds, for example. More particularly, a prior art wire board is replaced with the above-described stack-up interconnection arrangement using the micro-via process and electroplating, for example. Production costs may also be reduced and production yields may be increased, as will be appreciated by those skilled in the art. Additionally, the dielectric layer 43 advantageously may provide increased mechanical durability, since it covers the finger sensing IC die 50.

It should be noted that the finger sensing device described herein may be included within any electronic device, or may be used as a standalone finger sensing device to be coupled to or used in conjunction with other devices or circuitry. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger sensing device comprising:
   a mounting substrate having a recess in a top surface thereof and having a plurality of conductive through-vias extending from the top surface to a bottom surface, said conductive through-vias being laterally adjacent to the recess;
   a finger sensing integrated circuit (IC) die within the recess and comprising a finger sensing area on a top surface thereof and a plurality of bond pads on the top surface laterally adjacent said finger sensing area;
a dielectric layer over said mounting substrate and said finger sensing IC die; and
a conductive pattern carried by said dielectric layer and coupling said plurality of conductive through-vias to respective ones of said plurality of bond pads.

2. The finger sensing device according to claim 1, wherein said mounting substrate and said finger sensing IC die have flush top surfaces.

3. The finger sensing device according to claim 1, wherein each of said plurality of conductive through-vias comprises an upper tapered portion, a lower vertical portion, and an intermediate landing pad therebetween.

4. The finger sensing device according to claim 1, further comprising a respective conductive via coupling each of said plurality of bond pads and an adjacent portion of said conductive pattern.

5. The finger sensing device according to claim 1, wherein said conductive pattern defines a finger drive electrode.

6. The finger sensing device according to claim 1, further comprising a plurality of conductors coupled to respective ones of said plurality of conductive through-vias on the bottom surface of said mounting substrate and defining a grid array pattern.

7. The finger sensing device according to claim 1, further comprising a further dielectric layer over said conductive pattern and said dielectric layer.

8. The finger sensing device according to claim 1, wherein said dielectric layer has a thickness less than or equal to 25 microns.

9. The finger sensing device according to claim 1, wherein said plurality of conductive through-vias and said conductive pattern comprise copper.

10. A finger sensing device comprising:
a mounting substrate having a recess in a top surface thereof and having a plurality of conductive through-vias extending from the top surface to a bottom surface, said conductive through-vias being laterally adjacent to the recess;
a finger sensing integrated circuit (IC) die within the recess and comprising a finger sensing area on a top surface thereof and a plurality of bond pads on the top surface laterally adjacent said finger sensing area, the top surface being flush with the top surface of said mounting substrate;
a dielectric layer over said mounting substrate and said finger sensing IC die;
a conductive pattern carried by said dielectric layer and coupling said plurality of conductive through-vias to respective ones of said plurality of bond pads; and
a respective conductive via coupling each of said plurality of bond pads and an adjacent portion of said conductive pattern.

11. The finger sensing device according to claim 10, wherein each of said plurality of conductive through-vias comprises an upper tapered portion, a lower vertical portion, and an intermediate landing pad therebetween.

12. The finger sensing device according to claim 10, wherein said conductive pattern defines a finger drive electrode.

13. The finger sensing device according to claim 10, further comprising a plurality of conductors coupled to respective ones of said plurality of conductive through-vias on the bottom of said mounting substrate and defining a grid array pattern.

14. The finger sensing device according to claim 10, further comprising a further dielectric layer over said conductive pattern and said dielectric layer.

15. A method of making a finger sensing device comprising:
forming a mounting substrate having a recess in a top surface thereof and having a plurality of conductive through-vias extending from the top surface to a bottom surface, the conductive through-vias being laterally adjacent to the recess;
positioning a finger sensing integrated circuit (IC) die within the recess and comprising a finger sensing area on a top surface thereof and a plurality of bond pads on the top surface laterally adjacent the finger sensing area;
positioning a dielectric layer over the mounting substrate and the finger sensing IC die, the dielectric layer carrying a conductive pattern; and
coupling a conductive pattern to the plurality of conductive through-vias and to respective ones of the plurality of bond pads.

16. The method according to claim 15, wherein the finger sensing IC die is positioned to have the top surface flush with the top surface of the mounting substrate.

17. The method according to claim 15, wherein each of the plurality of conductive through-vias comprises an upper tapered portion, a lower vertical portion, and an intermediate landing pad therebetween.

18. The method according to claim 15, further comprising forming a respective conductive via to couple each of the plurality of bond pads and an adjacent portion of the conductive pattern.

19. The method according to claim 15, wherein the conductive pattern defines a finger drive electrode.

20. The method according to claim 15, further comprising coupling a plurality of conductors to respective ones of the plurality of conductive through-vias on the bottom surface of the mounting substrate and defining a grid array pattern.

21. The method according to claim 15, further comprising forming a further dielectric layer over the conductive pattern and the dielectric layer.

22. The method according to claim 15, wherein the plurality of through-vias are formed in the mounting substrate by laser drilling.

23. The method according to claim 15, wherein forming the conductive pattern comprises forming the conductive pattern layer by electroplating.

24. The method according to claim 15, wherein the plurality of the conductive through-vias are electroplated.

* * * * *